United States Patent
Chen et al.

(10) Patent No.: US 9,442,673 B2
(45) Date of Patent: Sep. 13, 2016

(54) METHOD AND APPARATUS FOR STORING DATA USING A DATA MAPPING ALGORITHM

(71) Applicant: Huawei Technologies Co., Ltd., Shenzhen, Guangdong (CN)

(72) Inventors: Zhihui Chen, Shenzhen (CN); Daohui Wang, Shenzhen (CN); Zhenxing Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 14/291,314

(22) Filed: May 30, 2014

(65) Prior Publication Data

US 2014/0281215 A1    Sep. 18, 2014

Related U.S. Application Data

(63) Continuation of application No. PCT/CN2012/072925, filed on Mar. 23, 2012.

(30) Foreign Application Priority Data

Nov. 30, 2011   (CN) .......................... 2011 1 0390178

(51) Int. Cl.
*G06F 12/00* (2006.01)
*G06F 3/06* (2006.01)
(Continued)

(52) U.S. Cl.
CPC ............. *G06F 3/065* (2013.01); *G06F 3/0604* (2013.01); *G06F 3/0614* (2013.01);
(Continued)

(58) Field of Classification Search
USPC .................................................. 711/112, 114
See application file for complete search history.

(56) References Cited

U.S. PATENT DOCUMENTS

| 6,202,118 B1 * | 3/2001 | Klein ................... | G06F 3/0613 711/112 |
| 7,330,323 B1 * | 2/2008 | Singh .................... | G11B 5/455 360/31 |

(Continued)

FOREIGN PATENT DOCUMENTS

| CN | 101192924 A | 6/2008 |
| CN | 101390075 A | 3/2009 |

(Continued)

OTHER PUBLICATIONS

"A Model of Replica Management Based on Distributed Parallel File System HDFS", Apr. 2010, 67 pages.

*Primary Examiner* — Mardochee Chery

(57) ABSTRACT

The storage method according to the present invention includes: partitioning raw data into several data blocks; calculating, according to a preset mapping algorithm, three consecutive virtual storage partitions to which a first data block is mapped, where a virtual storage partition is a partition obtained by dividing a virtual storage area, each of the virtual storage partitions is mapped to one physical disk, physical disks have consecutive sequence numbers, and sequence numbers of three physical disks that are mapped to the three consecutive virtual storage partitions are in an arithmetic sequence with a non-zero common difference; and storing, according to the calculated three consecutive virtual storage partitions and the three physical disks that are mapped to the three consecutive virtual storage partitions, the first data block and a first copy and a second copy of the first data block in the three physical disks in sequence.

8 Claims, 8 Drawing Sheets

(51) Int. Cl.
    *G06F 17/30*     (2006.01)
    *G06F 11/07*     (2006.01)

(52) U.S. Cl.
    CPC .......... *G06F 3/0631* (2013.01); *G06F 3/0683* (2013.01); *G06F 3/0689* (2013.01); *G06F 11/0727* (2013.01); *G06F 11/0793* (2013.01); *G06F 17/30* (2013.01); *G06F 2003/0692* (2013.01); *G06F 2003/0697* (2013.01)

(56) References Cited

U.S. PATENT DOCUMENTS

| | | | | |
|---|---|---|---|---|
| 2003/0088734 | A1* | 5/2003 | Cavallo | G06F 13/1631 711/114 |
| 2003/0120837 | A1* | 6/2003 | Ippolito | G06F 3/0601 710/33 |
| 2005/0182771 | A1* | 8/2005 | Grubbs | G06F 17/30067 |
| 2007/0208748 | A1 | 9/2007 | Li | |

FOREIGN PATENT DOCUMENTS

| | | |
|---|---|---|
| CN | 101834897 A | 9/2010 |
| CN | 101840366 A | 9/2010 |
| CN | 102117262 A | 7/2011 |
| CN | 102196049 A | 9/2011 |
| CN | 102222090 A | 10/2011 |

\* cited by examiner

201 — Acquire, for each virtual storage partition that is mapped to the failing physical disk, three groups of the three consecutive virtual storage partitions that include the virtual storage partition 202 — Acquire, for each group of the three consecutive virtual storage partitions, a first physical disk and a second physical disk to which the remaining two virtual storage partitions are mapped, except for the virtual storage partition that is mapped to the failing physical disk 203 — Determine, according to the first physical disk and the second physical disk, a target physical disk that is used for recovering data 204 — Copy a target data block that is stored in the first physical disk and/or the second physical disk to the target physical disk 205 — Renumber a part of physical disks, so that physical disks that are not faulty have consecutive numbers

FIG. 5

| Consecutive Virtual Storage Partitions | | | Physical Disk Combination |
|---|---|---|---|
| $\{p_1, p_2, p_3\}$ | $\{p_9, p_{10}, p_{11}\}$ | $\{p_{17}, p_{18}, p_{19}\}$ | 1#, 2#, 3# |
| $\{p_2, p_3, p_4\}$ | $\{p_{10}, p_{11}, p_{12}\}$ | $\{p_{18}, p_{19}, p_{20}\}$ | 2#, 3#, 4# |
| $\{p_3, p_4, p_5\}$ | $\{p_{11}, p_{12}, p_{13}\}$ | $\{p_{19}, p_{20}, p_{21}\}$ | 3#, 4#, 5# |
| $\{p_4, p_5, p_6\}$ | $\{p_{12}, p_{13}, p_{14}\}$ | $\{p_{20}, p_{21}, p_{22}\}$ | 4#, 5#, 6# |
| $\{p_5, p_6, p_7\}$ | $\{p_{13}, p_{14}, p_{15}\}$ | $\{p_{21}, p_{22}, p_{23}\}$ | 5#, 6#, 7# |
| $\{p_6, p_7, p_8\}$ | $\{p_{14}, p_{15}, p_{16}\}$ | $\{p_{22}, p_{23}, p_{24}\}$ | 6#, 7#, 8# |
| $\{p_7, p_8, p_9\}$ | $\{p_{15}, p_{16}, p_{17}\}$ | $\{p_{23}, p_{24}, p_1\}$ | 7#, 8#, 1# |
| $\{p_8, p_9, p_{10}\}$ | $\{p_{16}, p_{17}, p_{18}\}$ | $\{p_{24}, p_1, p_2\}$ | 8#, 1#, 2# |

FIG. 6

| Consecutive Virtual Storage Partitions | | | Physical Disk Combination |
|---|---|---|---|
| $\{p_1, p_2, p_3\}$ | $\{p_8, p_9, p_{10}\}$ | $\{p_{15}, p_{16}, p_1\}$ | 1#, 2#, 3# |
| $\{p_2, p_3, p_4\}$ | $\{p_9, p_{10}, p_{11}\}$ | $\{p_{16}, p_1, p_2\}$ | 2#, 3#, 4# |
| $\{p_3, p_4, p_5\}$ | $\{p_{10}, p_{11}, p_{12}\}$ | | 3#, 4#, 5# |
| $\{p_4, p_5, p_6\}$ | $\{p_{11}, p_{12}, p_{13}\}$ | | 4#, 5#, 6# |
| $\{p_5, p_6, p_7\}$ | $\{p_{12}, p_{13}, p_{14}\}$ | | 5#, 6#, 7# |
| $\{p_6, p_7, p_8\}$ | $\{p_{13}, p_{14}, p_{15}\}$ | | 6#, 7#, 1# |
| $\{p_7, p_8, p_9\}$ | $\{p_{14}, p_{15}, p_{16}\}$ | | 7#, 1#, 2# |

METHOD AND APPARATUS FOR STORING DATA USING A DATA MAPPING ALGORITHM

CROSS-REFERENCE TO RELATED APPLICATIONS

This application is a continuation of International Application No. PCT/CN2012/072925, filed on Mar. 23, 2012, which claims priority to Chinese Patent Application No. 201110390178.8, filed on Nov. 30, 2011, both of which are hereby incorporated by reference in their entireties.

TECHNICAL FIELD

The present invention relates to the field of information technologies, and in particular, to a storage method and a storage apparatus.

BACKGROUND

Cloud storage refers to a system that uses functions such as a cluster application, a grid technology, or a distributed file system to integrate a large quantity of various storage devices on a network by using application software to work collaboratively and provide data storage and service access functions externally. At present, there are two cloud storage architectures: a centralized architecture represented by a Google file system and a decentralized mass distributed storage architecture (a peer-to-peer storage architecture) that is based on the peer-to-peer (Peer to Peer, P2P) technology.

A logical volume in a peer-to-peer storage system is virtual storage space formed by storage blocks of a certain size and externally provides block storage services. An underlying storage engine mainly relies on a distributed hash table (Distributed Hash Table, DHT) ring constructed by using the DHT technology. The DHT ring integrates the entire storage space by using the virtualization technology and transparently provides a logical volume service with a certain capacity for an upper layer. The DHT ring is logically segmented into N partitions, and a data block stored in each storage block in a logical volume is allocated to a certain specified partition in the DHT ring by using the hash algorithm. To improve data storage reliability, two copies of the data block are stored in two adjacent partitions behind the specified partition (the number of copies used for backup is adjustable), which may be considered that the data block is mapped to the three partitions, that is, the data block is mapped to a group of logically consecutive partitions. Because each data block and a copy thereof are separately stored in three consecutive partitions, storage reliability for the three consecutive partitions needs to be ensured. The prior art only ensures that the three partitions are not mapped to the same physical disk, that is, three physical disks are randomly selected among all physical disks and are used as a physical disk combination to store the three consecutive partitions.

In the foregoing process, the inventor finds that the prior art has at least the following problems:

The prior art uses a random-mapping policy. When the number of partitions is relatively very large when compared with the number of physical disks, at least one group of three consecutive partitions are placed in each physical disk combination that is randomly selected, so as to balance data in the physical disks and output/input traffic. When any group in the physical disk combination is faulty, a set of data blocks and two sets of copies thereof are also lost, which results in low data reliability. For example, when the total number of physical disks is 5, the number of combinations of three physical disks is 10, which is obtained by taking 3 from 5. When any group of the 10 physical disk combinations is faulty, that is, three physical disks are faulty, a data block and two sets of copies thereof stored on the faulty physical disks are also lost. Even when the number of partitions is less than the number of physical disks, there is a high probability of losing both the data block and the two sets of copies thereof due to a fault of a physical disk combination, and a technical issue of low data reliability may also be caused.

SUMMARY

A technical issue needs to be resolved by the present invention is as follows: A storage method and a storage apparatus need to be provided, so as to resolve a problem in the prior art where there is a high probability of losing both data and copies thereof and to improve data storage reliability.

To achieve the foregoing objective, embodiments of the present invention use the following technical solutions:

A storage method, including:

partitioning raw data into several data blocks;

calculating, according to a preset mapping algorithm, three consecutive virtual storage partitions to which a first data block is mapped, where a virtual storage partition is a partition obtained by dividing a virtual storage area, each of the virtual storage partitions is mapped to one physical disk, physical disks have consecutive sequence numbers, and sequence numbers of three physical disks that are mapped to the three consecutive virtual storage partitions are in an arithmetic sequence with a non-zero common difference; and storing, according to the calculated three consecutive virtual storage partitions and the three physical disks that are mapped to the three consecutive virtual storage partitions, the first data block and a first copy and a second copy of the first data block in the three physical disks in sequence.

The embodiments of the present invention further provide a storage apparatus, including:

a partitioning module, configured to partition raw data into several data blocks;

a calculating module, configured to calculate, according to a preset mapping algorithm, three consecutive virtual storage partitions to which a first data block is mapped, where a virtual storage partition is a partition obtained by dividing a virtual storage area, each of the virtual storage partitions is mapped to one physical disk, physical disks have consecutive sequence numbers, and sequence numbers of three physical disks that are mapped to the three consecutive virtual storage partitions are in an arithmetic sequence with a non-zero common difference; and a storage module, configured to store, according to the calculated three consecutive virtual storage partitions and the three physical disks that are mapped to the three consecutive virtual storage partitions, the first data block and a first copy and a second copy of the first data block in the three physical disks in sequence.

The storage method and storage apparatus in the embodiments of the present invention store only a data block and the copies thereof in a regular physical disk combination, for example, separately store them in a group of physical disks whose sequence numbers are in an arithmetic sequence; the prior art, however, only ensures that the data block and the copies thereof are not stored in the same physical disk, that is, the data block and the copies thereof are randomly stored in different physical disks. Compared with the prior art, the storage method and storage apparatus in the embodiments of the present invention reduce the number of physical disk combinations to which three logically consecutive partitions are mapped, thereby improving data storage reliability.

BRIEF DESCRIPTION OF THE DRAWINGS

FIG. 5 is a flowchart of a storage method according to Embodiment 1 of the present invention;

FIG. 6 is a schematic diagram of a mapping between consecutive virtual storage partitions and physical disks according to Embodiment 1 of the present invention;

DETAILED DESCRIPTION

A technical issue needs to be resolved by embodiments of the present invention is as follows: A storage method and a storage apparatus need to be provided, so as to resolve a problem in the prior art where there is a high probability of losing both data and copies thereof and to improve data storage reliability.

The following describes the embodiments of the present invention in detail with reference to accompanying drawings. It should be understood that the specific embodiments described herein are merely used for describing the present invention, but are not intended to limit the present invention.

Embodiment 1

Figure 1:
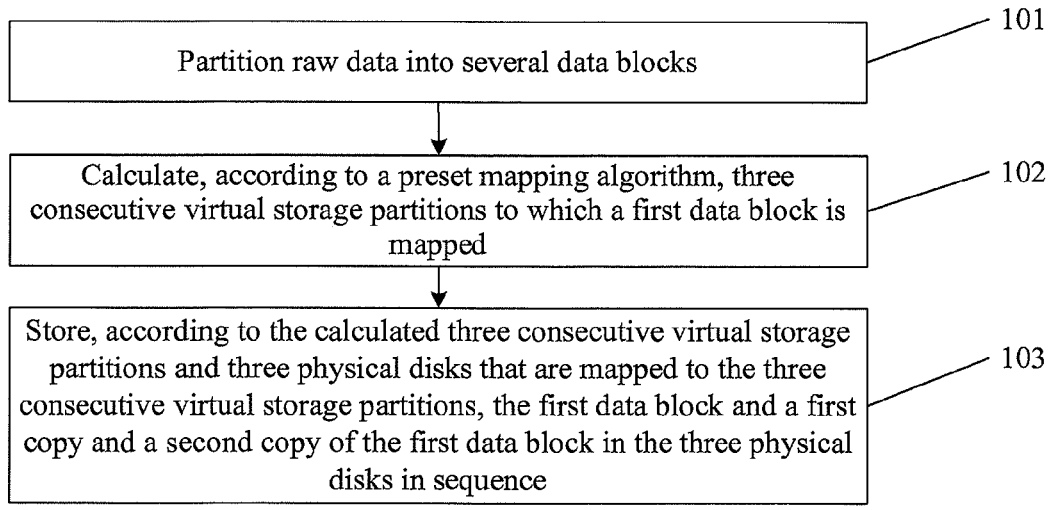
FIG. 1 is a flowchart of a storage method according to Embodiment 1 of the present invention.

This embodiment of the present invention provides a storage method. As shown in FIG. 1, the method includes:

Step 101: Partition raw data into several data blocks.

A size of a data block in this step is configurable. A typical value is 1 M.

Step 102: Calculate, according to a preset mapping algorithm, three consecutive virtual storage partitions to which a first data block is mapped, where a virtual storage partition is a partition obtained by dividing a virtual storage area, each of the virtual storage partitions is mapped to one physical disk, physical disks have consecutive sequence numbers, and sequence numbers of three physical disks that are mapped to the three consecutive virtual storage partitions are in an arithmetic sequence with a non-zero common difference.

Figure 2:
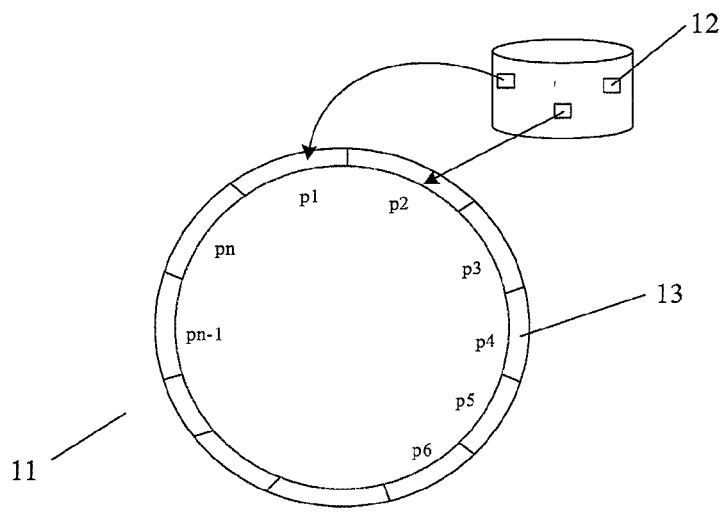
FIG. 2 is a schematic diagram of a distributed hash table ring according to Embodiment 1 of the present invention.

The virtual storage area in this step may be virtualized by using a DHT ring. As shown in FIG. 2, a DHT ring 11 with a value range of 0 to $2^{32}-1$ is logically divided into N areas (N is much less than $2^{32}$), each area on the DHT ring 11 is referred to as a virtual storage partition 13, and each virtual storage partition 13 on the DHT ring is clockwise named $p_1$-$p_n$ in sequence. Upon storage, raw data is partitioned into several data blocks 12; a keyword such as a file name is extracted from a data block 12, a result is calculated by using a preset mapping algorithm, and the data block 12 is then allocated to a corresponding virtual storage partition 13 according to a value range within which the result falls on the DHT ring; meanwhile, two copies of the data block are separately allocated to two virtual storage partitions that are logically contiguous to the corresponding virtual storage partition to improve data storage reliability. Therefore, the data block may be considered to be mapped to the three logically consecutive virtual storage partitions, that is, the data block is mapped to a group of logically consecutive virtual storage partitions, and eventually each data block is mapped to a group of consecutive virtual storage partitions.

Figure 3:
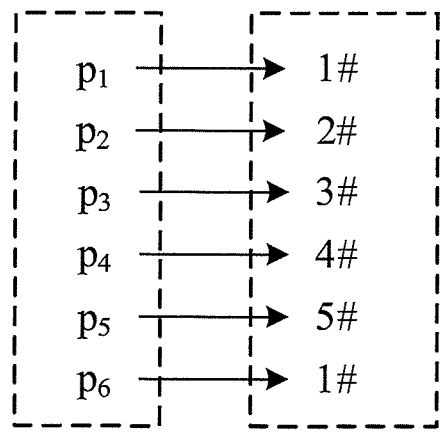
FIG. 3 is a schematic diagram 1 of a mapping between a virtual storage partition and a physical disk according to Embodiment 1 of the present invention.

Assume that the DHT ring has six virtual storage partitions that are named $p_1$-$p_6$ in sequence. In a typical case, three logically consecutive virtual storage partitions are three consecutive adjacent virtual storage partitions, and there are six groups of such consecutive virtual storage partitions, that is, {p1, p2, p3}, {p2, p3, p4}, {p3, p4, p5}, {p4, p5, p6}, {p5, p6, p1}, and {p6, p1, p2}. Assume that the total number of physical disks is 5, the physical disks have consecutive sequence numbers from 1# to 5#, and the five physical disks are logically connected end to end as a ring, that is, a physical disk numbered 1# is arranged following a physical disk numbered 5#. In this step, each virtual storage partition is mapped to one physical disk, and an excessive storage partition, starting anew, is mapped to the five physical disks in sequence, as shown in FIG. 3.

Figure 4:
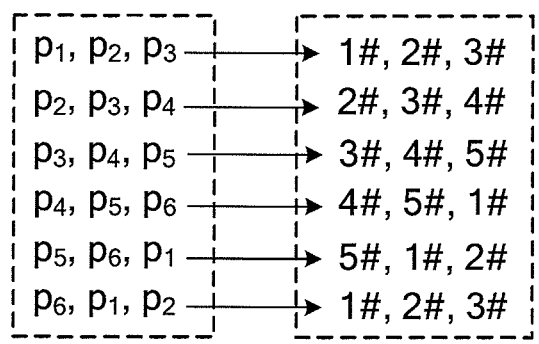
FIG. 4 is a schematic diagram of a mapping between consecutive virtual storage partitions and three physical disks according to Embodiment 1 of the present invention.

In this step, sequence numbers of three physical disks that are mapped to the three consecutive virtual storage partitions are in an arithmetic sequence. If a common difference of the arithmetic sequence is 1, that is, the three physical disks that are mapped to the three consecutive virtual storage partitions are three consecutively numbered physical disks, and the three consecutively numbered physical disks form a physical disk combination. Among five physical disks numbered from 1# to 5#, there are five physical disk combinations having sequence numbers in an arithmetic sequence, that is, {1#, 2#, 3#}, {2#, 3#, 4#}, {3#, 4#, 5#}, {4#, 5#, 1#}, and {5#, 1#, 2#}. Eventually, as shown in FIG. 4, the three consecutive virtual storage partitions $\{p_1, p_2, p_3\}$ are respectively mapped to three physical disks numbered {1#, 2#, 3#}, whereas $\{(p_2, p_3, p_4\}$ are respectively mapped to three physical disks numbered {2#, 3#, 4#}; similarly, $\{p_5, p_6, p_1\}$ are respectively mapped to three physical disks numbered {5#, 1#, 2#} in the last group. To balance data stored in each physical disk and input and output traffic, $\{(p_6, p_1, p_2\}$ are, starting anew, mapped to a first group of physical disk combinations, that is, $\{p_6, p_1, p_2\}$ are respectively mapped to the three physical disks numbered $\{1\#, 2\#, 3\#\}$.

In this step, physical disks have consecutive sequence numbers. However, it should be understood that the sequence numbers are not limited to natural numbers. For example, consecutive sequence numbers may be 1, 3, 5, 7, and so on, whereas physical disks numbered 2, 4, and 6 do not exist in between.

The preset mapping algorithm is a hash algorithm.

Step 103: Store, according to the calculated three consecutive virtual storage partitions and the three physical disks that are mapped to the three consecutive virtual storage partitions, the first data block and a first copy and a second copy of the first data block in the three physical disks in sequence.

In this step, a data block is stored according to a calculated virtual storage partition. According to the preset mapping algorithm, the first data block is allocated to the virtual storage partition $p_1$, and two copies of the first data blocks are separately allocated to two virtual storage partitions that are logically contiguous to the corresponding virtual storage partition at the same time, that is, are allocated to adjacent virtual storage partitions $p_2$ and $p_3$ according to the foregoing assumption; that is, the first data block is mapped to the three consecutive virtual storage partitions $p_1$, $p_2$, and $p_3$. The three consecutive virtual storage partitions, however, are mapped to the three physical disks numbered $\{1\#, 2\#, 3\#\}$ according to the foregoing assumption. Therefore, the first data block is stored in the physical disk numbered 1#, the first copy of the first data block is stored in the physical disk numbered 2#, and the second copy of the first data block is stored in the physical disk numbered 3#, that is, a copy with the same content as the first data block is separately stored in the physical disk numbered 2# and the physical disk numbered 3# as the first copy and the second copy of the first data block. Similarly, the remaining data blocks allocated to the virtual storage partitions $p_1$ are stored in the three physical disks numbered $\{1\#, 2\#, 3\#\}$; all data blocks allocated to the virtual storage partitions $p_6$, however, are eventually stored in the three physical disks numbered $\{1\#, 2\#, 3\#\}$, which is similar to a process of storing the first data block, because the three consecutive virtual storage partitions $\{(p_6, P_1, P_2\}$ are mapped to the three physical disks numbered $\{1\#, 2\#, 3\#\}$ according to the foregoing assumption.

In addition, similarly, when the common difference is 2, according to the foregoing assumption, the first data block is stored in the three physical disks numbered $\{1\#, 3\#, 5\#\}$.

As a preferred solution, the common difference of the arithmetic sequence is 1.

Specifically, when the common difference of the arithmetic sequence is 1, a specific process of the storage method in this embodiment is as follows:

Step S101: Uniformly number all physical disks according to physical disk identification information, that is, a disk identification and a node identification.

A physical disk identification in this step is a serial number of a physical disk, and a node in this step is a data storage unit. During actual storage, a hard disk may be considered as a node.

Step S102: Establish a one-dimensional array Q according to the total number of physical disks, and assign a value to each element in the array Q, that is, store physical disk identification information in the array Q.

In this step, if the total number of physical disks is M, there are M consecutive physical disk combinations, and a one-dimensional array Q of size M is established, that is, the number of elements in the array Q is M. Identification information of a physical disk numbered i, that is, the disk identification and the node identification, is assigned to an element $Q_{[i]}$ in the array Q.

Step S103: Read system configuration information, acquire the number of virtual storage partitions partitioned by a system, and establish a one-dimensional array P of size N according to the total number N of the foregoing virtual storage partitions, where a data format of each element in the array P is a long integer.

The system configuration information in this step is preset by a storage system.

Step S104: For all virtual storage partitions (0 to N−1) on the DHT ring, establish a specific data mapping for virtual storage partitions in a cyclic manner in sequence, specifically including: acquiring a physical disk to which a current virtual storage partition needs to be mapped and saving data blocks into the array Q, and storing all data blocks allocated to the current virtual storage partition in an actually allocated physical disk combination.

In this step, all data blocks in the current virtual storage partition include both data blocks allocated to the virtual storage partition and copies of the data blocks allocated to the virtual storage partition.

After the foregoing mapping is completed according to a rule, data in the array Q is saved, that is, a correspondence between identification information and the sequence numbers of all physical disks is saved for future use.

A main idea for the storage method according to the embodiments of the present invention is to establish a specific mapping between a virtual storage partition and a physical disk to decrease the total number of physical disk combinations to which consecutive virtual storage partitions are mapped. There may be a plurality of methods for establishing a mapping, for example, sequence numbers of physical disks are in an arithmetic sequence or in other combination manners. Actually, if physical disk combinations are arranged according to a certain rule and consecutive virtual storage partitions on the DHT ring are mapped only to such regular physical disk combinations, the total number of physical disk combinations is decreased, compared with the prior art, thereby improving data storage reliability.

In addition, in the storage method according to the embodiments of the present invention, three physical disks are mapped to each group of consecutive virtual storage partitions, because each data block is generally stored three times in the prior art (two copies are copies used for backup). Therefore, it can be learnt that the number of virtual storage partitions in a group of consecutive virtual storage partitions is related to the number of copies used for backup in the storage. Therefore, the number of virtual storage partitions in a group of consecutive virtual storage partitions and the number of physical disks that are mapped to the consecutive virtual storage partitions are not limited to three.

In the storage method according to this embodiment, consecutive virtual storage partitions are mapped only to a regular physical disk combination, for example, three physical disks having sequence numbers in an arithmetic sequence. Compared with the prior art in which virtual storage partitions in a group of consecutive virtual storage partitions are randomly mapped to three physical disks, the number of physical disk combinations is reduced and data storage reliability is significantly improved. A larger number of physical disks used for storage reduce the number of physical disk combinations and improve data storage reliability more significantly.

Assume that a related apparatus in the present invention has 10 physical disks and an average annual failure rate per physical disk is 4%. A probability that three physical disks simultaneously fail within 12 hours is $0.12 \times 10^{-9}$. For a random mapping manner in the prior art, the number of combinations of three physical disks is 120, which is obtained by taking 3 from 10. When any one of the 120 physical disk combinations is faulty, a set of data blocks and a set of two copies thereof stored thereon may be lost simultaneously, resulting in low data reliability. Reliability of data stored on a storage apparatus based thereon is:

$$1 - 120 \times (0.12 \times 10^{-9}) = 0.9999999856 \quad (1)$$

For the storage method in this embodiment, consecutive virtual storage partitions are mapped to three physical disks having sequence numbers in an arithmetic sequence. If a common difference is 1, the number of combinations of the three physical disks having sequence numbers in an arithmetic sequence is 10. Therefore, reliability of data stored on a storage apparatus based thereon is:

$$1 - 10 \times (0.12 \times 10^{-9}) = 0.9999999998 \quad (2)$$

It can be learned from a comparison between (1) and (2) that, reliability of the storage apparatus based on the embodiments of the present invention is significantly improved. According to the foregoing assumption, in a case of 10 physical disks, data reliability is improved by about 100 times.

Further, according to the storage method in this embodiment, when any one of the physical disks is faulty and becomes a failing physical disk, a target disk can be automatically found for a data block stored in the failing physical disk to perform data copying and recovery. As shown in FIG. 5, the storage method further includes:

Step 201: Acquire, for each virtual storage partition that is mapped to the failing physical disk, three groups of the three consecutive virtual storage partitions that include the virtual storage partition.

Step 202: Acquire, for each group of the three consecutive virtual storage partitions, a first physical disk and a second physical disk to which the remaining two virtual storage partitions are mapped, except for the virtual storage partition that is mapped to the failing physical disk.

Step 203: Determine, according to the first physical disk and the second physical disk, a target physical disk that is used for recovering data.

Step 204: Copy a target data block that is stored in the first physical disk and/or the second physical disk to the target physical disk, where the target data block is a data block that is mapped to the three consecutive virtual storage partitions, or a first copy or a second copy of the data block.

Step 202 to step 204 are cyclically performed until all of the three consecutive virtual storage partitions are polled.

Step 205: Renumber a part of physical disks, so that physical disks that are not faulty have consecutive sequence numbers.

The following uses a specific example to describe the foregoing data recovery process in detail. The common difference of the arithmetic sequence is 1. According to the foregoing description, each data block is allocated to a group of consecutive virtual storage partitions or each data block and copies thereof are mapped to a group of consecutive virtual storage partitions, whereas all data blocks mapped to the same group of consecutive virtual storage partitions are stored in the same physical disk combination. For example, all data blocks mapped to consecutive virtual storage partitions {p1, p2, p3} are stored in the three physical disks {1#, 2#, 3#}. Therefore, for ease of description, a set of data blocks mapped to the same group of consecutive virtual storage partitions are referred to as P, and correspondingly a set of a first copy and a set of a second copy of each data block in the set of data blocks are respectively referred to as P' and P".

Figure 7:
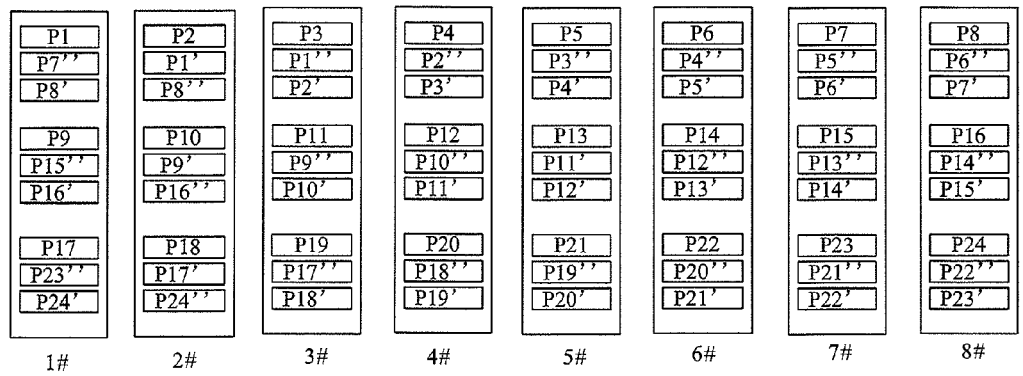
FIG. 7 is a schematic diagram of placement of a set of data blocks and a set of the copies thereof in a physical disk according to Embodiment 1 of the present invention.

Assume that 24 virtual storage partitions are separately named $p_1$ to $p_{24}$, 8 physical disks numbered from 1# to 8# are used for storage, the first 8 storage partitions are mapped to 8 physical disks in sequence, and excessive storage partitions, starting anew, are mapped to the 8 physical disks. As shown in FIG. 6, eventually, a group of consecutive storage partitions are mapped to a combination of the 8 physical disks. A set of data blocks allocated to each virtual storage partition, that is, a set of data blocks mapped to each group of consecutive virtual storage partitions are separately named P1 to P24, and correspondingly a set of each first copy and a set of each second copy are named P1' to P24' and P1' to P24". Eventually, a schematic diagram of placement of a set of data blocks P1 to P24, a set of the first copies P1' to P24', and a set of the second copies P1" to P24" on the 8 physical disks is shown in FIG. 7. Assume that, according to a preset mapping algorithm, if a first data block is allocated to the virtual storage partition $p_1$, the first data block is mapped to $\{p_1, p_2, p_3\}$, the first data block belongs to the set P1, a first copy of the first data block belongs to the set P1', and a second copy of the first data block belongs to the set P1". It can be learnt from FIG. 7 that, the first data block is stored in a physical disk 1#, the first copy of the first data block is stored in a physical disk 2#, and the second copy of the first data block is stored in a physical disk 3#. When a physical disk 4# among the foregoing physical disks is faulty and becomes a failing physical disk, a data copying and recovery process is as follows:

In step 201, for each virtual storage partition that is mapped to the failing physical disk 4#, three groups of the three consecutive virtual storage partitions that include the virtual storage partition, are acquired.

The sequence number of the failing physical disk is 4#, and virtual storage partitions that have a mapping relationship with the physical disk 4# are $p_4$, $p_{12}$, and $p_{20}$. The three consecutive virtual storage partitions of the virtual storage partition $p_4$ are $\{p_2, p_3, p_4\}$, $\{p_3, p_4, p_5\}$, and $\{p_4, p_5, p_6\}$, the three consecutive virtual storage partitions of the virtual storage partition $p_{12}$ are $\{p_{10}, p_{11}, p_{12}\}$, $\{p_{11}, p_{12}, p_{13}\}$, and $\{p_{12}, p_{13}, p_{14}\}$, whereas the three consecutive virtual storage partitions of the virtual storage partition $p_{20}$ are $\{p_{20}, p_{21}, p_{22}\}$, $\{p_{19}, p_{20}, p_{21}\}$, and $\{p_{18}, p_{19}, p_{20}\}$.

For each group of all the three consecutive virtual storage partitions, that is, $\{p_2, p_3, p_4\}$, $\{p_{10}, p_{11}, p_{12}\}$, $\{p_{18}, p_{19}, p_{20}\}$, $\{p_3, p_4, p_5\}$, $\{p_{11}, p_{12}, p_{13}\}$, $\{p_{19}, p_{20}, p_{21}\}$, $\{p_4, p_5, p_6\}$, $\{p_{12}, p_{13}, p_{14}\}$, and $\{p_{20}, p_{21}, p_{22}\}$, step 202 to step 204 are cyclically performed until all of the three consecutive virtual storage partitions are polled. The following uses the consecutive virtual storage partitions $\{p_{10}, p_{11}, p_{12}\}$ as an example for description.

In step 202, for the three consecutive virtual storage partitions $\{p_{10}, p_{11}, p_{12}\}$, except for the virtual storage partition $p_{12}$ that is mapped to the failing physical disk 4#, the virtual storage partition $p_{10}$ is mapped to a first physical disk 2#, and the virtual storage partition $p_{11}$ is mapped to a second physical disk 3#.

In step 203, according to the first physical disk 2# and the second physical disk 3#, a target physical disk used for recovering data is determined. Three physical disks that are previously mapped to $\{p_{10}, p_{11}, p_{12}\}$ are $\{2\#, 3\#, 4\#\}$. When the physical disk 4# is faulty, according to a principle that each virtual storage partition is mapped to one physical disk and sequence numbers of the three physical disks mapped to the consecutive virtual storage partitions $\{p_{10}, p_{11}, p_{12}\}$ are in an arithmetic sequence with common difference of 1, that is, consecutive mapping, only two physical disks may be used as target physical disks for recovering data, that is, the physical disk 1# or 5#. In this case, the sequence numbers of the three physical disks may still be in an arithmetic sequence with common difference of 1 after renumbering in step 205.

After it is determined that the physical disk 1# or 5# may be used as a target physical disk, load conditions of the physical disk 1# and the physical disk 5#, that is, sizes of used storage space or available storage space of the physical disk 1# and the physical disk 5#, are preferably compared. A physical disk with a light load (large available storage space) is selected as the target physical disk for recovering data. Assume that the load of the physical disk 5# is light. The physical disk 5# is selected as the target physical disk.

In step 204, a target data block that is stored in the first physical disk 2# and/or the second physical disk 3# is copied to the target physical disk 5#; correspondingly, the target data block is a second copy of all data blocks that are mapped to the three consecutive virtual storage partitions, that is, a set of second copies of the data blocks, namely, P10".

In this step, P10 in the physical disk 2# or P10' in the physical disk 3# may be selected as a data source when data is copied and recovered, and P10 or P10' is copied to the target physical disk (the physical disk 5#) as P10" after data recovery; alternatively, P10 and P10' may be selected together as data sources when data is copied and recovered, and the target data block is concurrently copied to the target physical disk as P10" after recovery. A copy speed for concurrent copying is faster; however, eventually, there is still only one copy with the same content as P10 or P10' in the target physical disk.

Figure 8:
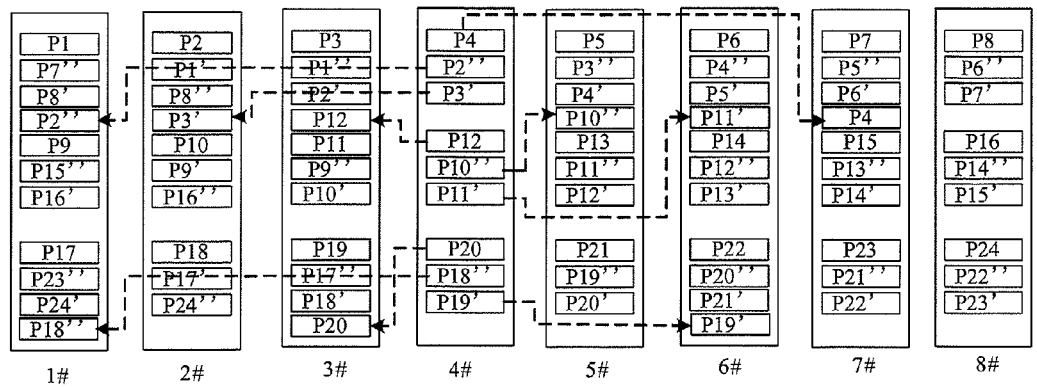
FIG. 8 is a schematic diagram of data recovery for a set of data blocks and the copies thereof when a physical disk fails according to Embodiment 1 of the present invention.

Similar to a processing process of the consecutive virtual storage partitions $\{p_{10}, p_{12}, p_{13}\}$, next consecutive virtual storage partitions are polled and processed, until all consecutive virtual storage partitions, that is, $\{p_2, p_3, p_4\}$, $\{p_{10}, p_{11}, p_{12}\}$, $\{p_{18}, p_{19}, p_{20}\}$, $\{p_3, p_4, p_5\}$, $\{p_{11}, p_{12}, p_{13}\}$, $\{p_{19}, p_{20}, p_{21}\}$, $\{p_4, p_5, p_6\}$, $\{p_{12}, p_{13}, p_{14}\}$, and $\{p_{20}, p_{21}, p_{22}\}$, are polled once. Use the consecutive virtual storage partitions $\{p_4, p_5, p_6\}$ as an example further. The virtual storage partition $p_5$ is mapped to the first physical disk 5#, the virtual storage partition $p_6$ is mapped to the second physical disk 6#, and the physical disk 3# or 7# may be used as a target physical disk. Considering a load condition, the physical disk 7# is determined as the target physical disk, and all target data blocks in the physical disk 5# or 6# are copied, as P4 after data recovery, to the physical disk 7#. The target data blocks mentioned here refer to a set of first copies P4' or a set of second copies P4" of data blocks that are mapped to the consecutive virtual storage partitions $\{(p_4, p_5, p_6)\}$. Eventually, as shown in FIG. 8, P4 is recovered to the physical disk 7#, P2" is recovered to the physical disk 1#, P3' is recovered to the physical disk 2#, and P12 is recovered to the physical disk 3#, and so on.

In step 205, a part of physical disks following the failing physical disk 4# are renumbered, so that physical disks that are not faulty have consecutive sequence numbers. The physical disk 5# is renumbered 4#. Similarly, the sequence number of an original physical disk is reduced by 1, sequence numbers of the original 5# to 8# are changed to 4# to 7#. After data recovery, the sequence number of a physical disk that stores P4 is changed to 6# whereas the sequence numbers of physical disks that store P4' and P4" are changed to 4# and 5#. In this way, P4 and copies P4' and P4" thereof are still stored in $\{4\#, 5\#, 6\#\}$, and the sequence numbers are still in an arithmetic sequence.

Specifically, when a physical disk having a disk sequence number X is detected to be faulty, a process of data block order-preserving recovery is triggered, where the order-preserving recovery means that, after data recovery, a data block and copies thereof are still stored in a combination of physical disks having sequence numbers in an arithmetic sequence. A specific process of data copying and recovery in this embodiment is as follows:

Step S201: According to the disk sequence number X of the physical disk, acquire a disk sequence number j of the failing physical disk by retrieving an array Q.

Step S202: According to the acquired disk sequence number j, acquire information about a group of data blocks that are mapped to the current failing physical disk numbered j, locate physical disks numbered j−1 and j−2, and specially, replace j−2 with N+(j−2) when j−2≤0, and replace j−1 with N+(j−1) when j−1≤0.

In this step, the group of data blocks refer to a set of data blocks, or a set of first copies, or a set of second copies that are mapped to the failing physical disk j. As shown in FIG. 8, if j is the physical disk 4#, a set of the data blocks that are mapped to the failing physical disk j refer to a set of data blocks that are mapped to $\{p_4, p_5, p_6\}$, $\{p_{12}, p_{13}, p_{14}\}$, or $\{p_{20}, p_{21}, p_{22}\}$, that is, P4, P12, or P20; a set of the first copies that are mapped to the failing physical disk j refer to a set of first copies of data blocks that are mapped to $\{p_3, p_4, p_5\}$, $\{p_{11}, p_{12}, p_{13}\}$, or $\{p_{19}, p_{20}, p_{21}\}$, that is, P3', P11', or P19'; likewise, a set of the second copies that are mapped to the failing physical disk j refer to a set of second copies of data blocks that are mapped to $\{p_2, p_3, p_4\}$, $\{p_{10}, p_{11}, p_{12}\}$, or $\{p_{18}, p_{19}, p_{20}\}$, that is, P2", P11", or P19".

Step S203: For each group of data blocks in the failing physical disk j, establish one cycle, poll the two physical disks j−2 and j−1, and locate a sequence number K of a disk in which the group of data blocks appears first.

If the disk sequence number K is j−2, data stored in the failing physical disk j is the second copy of the group of data blocks. Therefore, the data shall be recovered to a physical disk j+1 or j−3, loads of the two physical disks are queried preferably, and a physical disk with a lighter load is selected to perform data recovery, that is, data is concurrently copied from the physical disks j−2 and j−1 to the physical disk j+1 or j−3. Specially, when j+1>N, j+1 is replaced with (j+1)−N; when j−3≤0, j−3 is replaced with N+(j−3).

If the disk sequence number K is j−1, data stored in the physical disk j is the first copy of the group of data blocks. Therefore, the data shall be recovered to a physical disk j+2 or j−2, loads of the two physical disks are queried, and a physical disk with a lighter load is selected to perform data recovery, that is, data is concurrently copied from the physical disks j−1 and j+1 to the physical disk j+2 or j−2. Specially, when j+2>N, j+1 is replaced with (j+2)−N; when j−2≤0, j−3 is replaced with N+(j−2).

Otherwise, the disk sequence number K is j, and data stored in the physical disk j is data blocks that are mapped to the group of data blocks. Therefore, the data shall be recovered to the physical disk j−1 or j+3, loads of the two physical disks are queried, and a physical disk with a lighter load is selected to perform data recovery, that is, data is concurrently copied from the physical disks j+1 and j+2 to the physical disk j+3 or j−1. Specially, when j+3>N, j+1 is replaced with (j+3)−N; when j−1≤0, j−1 is replaced with N+(j−1).

Step S204: After data recovery for the foregoing group of data blocks is completed, re-organize data in the array Q, change the number M of physical disks to M−1, and perform renumbering, that is, the disk sequence number that is stored in array elements having a current sequence number j+1 and following sequence numbers is reduced by 1.

The storage method in this embodiment further includes: when one of physical disks used for storage is faulty and becomes a failing physical disk, automatically searching for a target disk for a data block placed thereon to perform data copying and recovery, so that the recovered data block and copies thereof are still placed in a combination of physical disks having sequence numbers in an arithmetic sequence, thereby ensuring that data reliability after the fault is rectified does not decrease.

Figure 9:
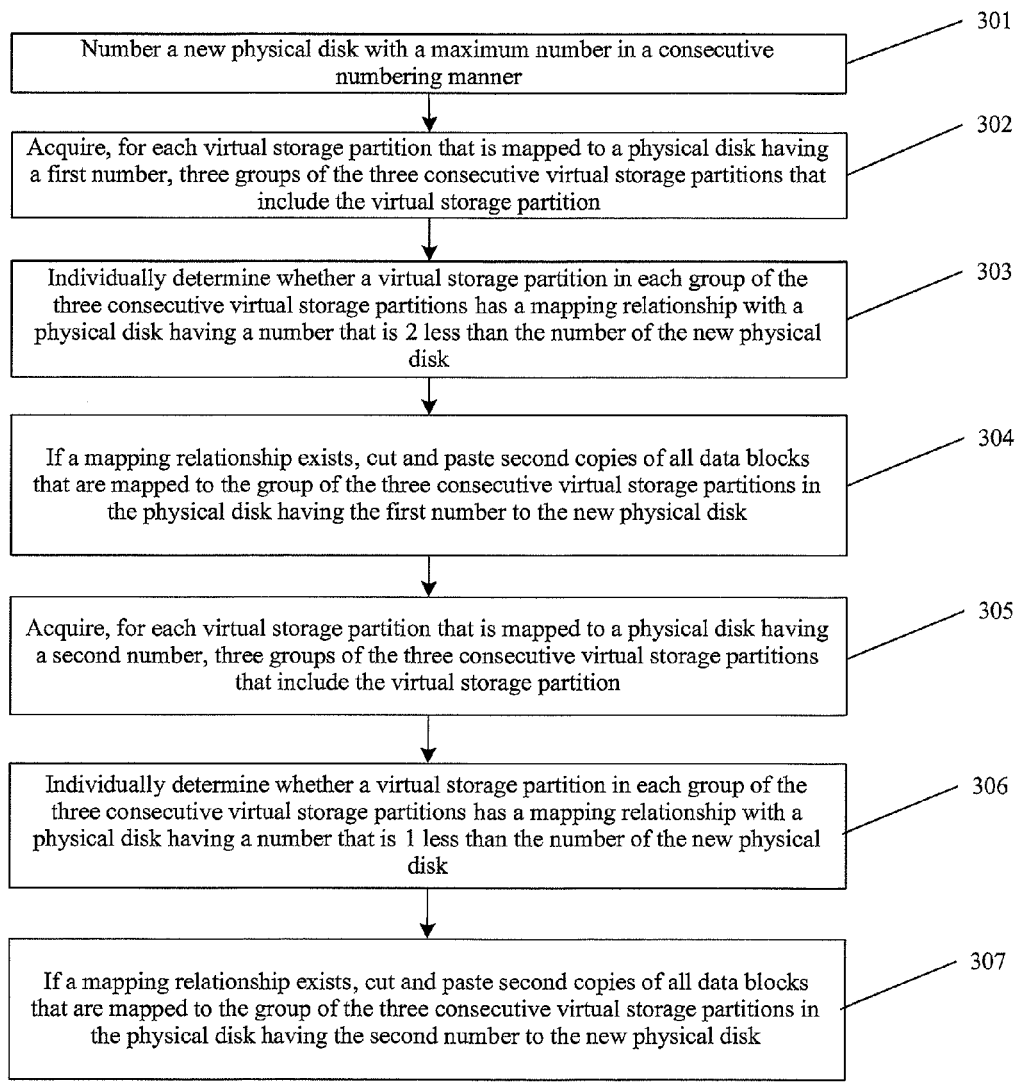
FIG. 9 is a flowchart of a storage method according to Embodiment 1 of the present invention.

Further, as shown in FIG. 9, according to the storage method in this embodiment, when a new physical disk is detected, data on a part of physical disks is automatically migrated to the new physical disk, after the new disk is online. The storage method further includes:

Step 301: Number the new physical disk with a maximum sequence number in a consecutive numbering manner.

Figures 10, 11:
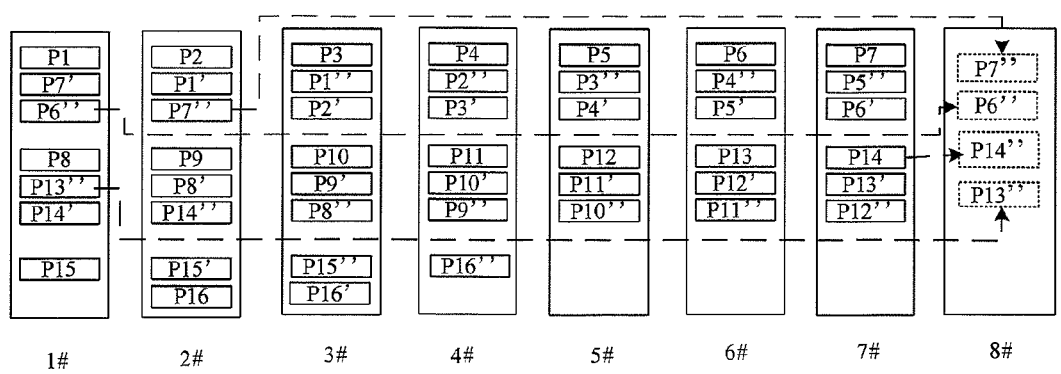
FIG. 10 is a schematic diagram of a mapping between consecutive virtual storage partitions and physical disks according to Embodiment 1 of the present invention.
FIG. 11 is a schematic diagram of migration of a set of data blocks and the copies thereof when a new physical disk is added according to Embodiment 1 of the present invention.

In this step, the new physical disk and an original physical disk only need to be eventually numbered in a consecutive manner. An optimal method, however, is to continue to number the new physical disk on a basis of the original sequence number in a consecutive numbering manner. For example, assume that 16 virtual storage partitions are separately named $p_1$ to $p_{16}$, 7 physical disks numbered from 1# to 7# are used for storage, and sequence numbers of physical disks that are mapped to the three consecutive virtual storage partitions are in an arithmetic sequence, and the common difference is 1. A mapping relationship is shown in FIG. 10. Eventually, a schematic diagram of placement of each set of data blocks P1 to P16, each set of first copies P1' to P16', and each set of second copies P1" to P16" on the 7 physical disks is shown in FIG. 11. When a new physical disk is added, the new physical disk is directly and logically numbered 8#.

Step 302: Acquire, for each virtual storage partition that is mapped to a physical disk having a first sequence number, three groups of the three consecutive virtual storage partitions that include the virtual storage partition.

In this step, still according to the foregoing assumption, it can be learnt that the virtual storage partitions $p_1$, $p_8$, and $p_{15}$ are mapped to the physical disk 1#. Three groups of the consecutive virtual storage partitions including the virtual storage partition $p_1$ are $\{p_1, p_2, p_3\}$, $\{p_{15}, p_{16}, p_1\}$, and $\{p_{16}, p_1, p_2\}$; three groups of the consecutive virtual storage partitions including $p_8$ are $\{p_6, p_7, p_8\}$, $\{p_7, p_8, p_9\}$, and $\{p_8, p_9, p_{10}\}$; and three groups of the consecutive virtual storage partitions including $p_{15}$ are $\{p_{13}, p_{14}, p_{15}\}$, $\{p_{14}, p_{15}, p_{16}\}$, and $\{p_{15}, p_{16}, p_1\}$.

Step 303: Individually determine whether a virtual storage partition in each group of the three consecutive virtual storage partitions has a mapping relationship with a physical disk having a sequence number that is 2 less than the sequence number of the new physical disk.

In this step, still according to the foregoing assumption, it can be learnt that the physical disk having a sequence number that is 2 less than the sequence number of the new physical disk 8# is the physical disk 6#, and virtual storage partitions that have a mapping relationship with the physical disk 6# are $p_6$ and $p_{13}$. In step 302, among all consecutive virtual storage partitions $\{p_1, p_2, p_3\}$, $\{p_{15}, p_{16}, p_1\}$, $\{p_{16}, p_1, p_2\}$, $\{p_6, p_7, p_8\}$, $\{p_7, p_8, p_9\}$, $\{p_8, p_9, p_{10}\}$, $\{p_{13}, p_{14}, p_{15}\}$, $\{p_{14}, p_{15}, p_{16}\}$, and $\{p_{15}, p_{16}, p_1\}$, only $p_6$ and $p_{13}$ in the consecutive virtual storage partitions $\{p_6, p_7, p_8\}$ and $\{p_{13}, p_{14}, p_{15}\}$ have a mapping relationship with the physical disk 6#.

Step 304: If a mapping relationship exists, cut and paste second copies of all data blocks that are mapped to the group of the three consecutive virtual storage partitions in the physical disk having the first sequence number to the new physical disk.

In this step, still according to the foregoing assumption, $p_6$ and $p_{13}$ in $\{p_6, p_7, p_8\}$ and $\{p_{13}, p_{14}, p_{15}\}$ have a mapping relationship with the physical disk 6#. In the physical disk having the first sequence number, that is, the physical disk 1#, second copies of all data blocks that are mapped to the group of the consecutive virtual storage partitions $\{p_6, p_7, p_8\}$ are a set of second copies P6"; second copies of all data blocks that are mapped to the group of the consecutive virtual storage partitions $\{p_{13}, p_{14}, p_{15}\}$, are a set of second copies P13". In this step, P6" and P13" stored in the physical disk 1# are cut and pasted to the new physical disk.

Step 305: Acquire, for each virtual storage partition that is mapped to a physical disk having a second sequence number, three groups of the three consecutive virtual storage partitions that include the virtual storage partition.

In this step, still according to the foregoing assumption, virtual storage partitions that are mapped to the physical disk 2# are $p_2$, $p_9$, and $p_{16}$, and the three consecutive virtual storage partitions that include these virtual storage partitions are $\{p_1, p_2, p_3\}$, $\{p_2, p_3, p_4\}$, $\{p_{16}, p_1, p_2\}$, $\{p_8, p_9, p_{10}\}$, $\{p_7, p_8, p_9\}$, $\{p_9, p_{10}, p_{11}\}$, $\{p_{15}, p_{16}, p_1\}$, and $\{p_{14}, p_{15}, p_{16}\}$.

Step 306: Further, individually determine whether a virtual storage partition in each group of the three consecutive virtual storage partitions has a mapping relationship with a physical disk having a sequence number that is 1 less than the sequence number of the new physical disk.

Still according to the foregoing assumption, among all of the three consecutive virtual storage partitions in step 305, only $p_7$ in $\{p_7, p_8, p_9\}$ and $p_{14}$ in $\{p_{14}, p_{15}, p_{16}\}$ have a mapping relationship with the physical disk 7#.

Step 307: If a mapping relationship exists, cut and paste second copies of all data blocks that are mapped to the group of the three consecutive virtual storage partitions in the physical disk having the second sequence number to the new physical disk.

Still according to the foregoing assumption, in this step, a set of second copies of all data blocks that are mapped to the group of consecutive virtual storage partitions $\{p_7, p_8, p_9\}$ and a set of second copies of all data blocks that are mapped to $\{p_{14}, p_{15}, p_{16}\}$, that is, P7" and P14' stored in the physical disk 2#, are cut and pasted to the new physical disk.

The method in this embodiment ensures that, when a physical disk is added, data in a part of physical disks is automatically placed on the new physical disk. Eventually, as shown in FIG. 11, a data block and copies thereof are still placed on physical disks having sequence numbers in an arithmetic sequence, for example, P7, P7", and P7' are stored on the physical disks {7#, 8#, 1#}.

Specifically, when a physical disk used for storage is added, a part of data is automatically placed on the new physical disk and excess data on an original disk is deleted after the new disk is online. A specific logical process of the order-preserving expansion method in this embodiment is as follows:

When a physical disk having disk identification Y is detected to be online, an order-preserving expansion process for a data block is triggered. The order-preserving expansion indicates that the data block and copies thereof are still placed in a regular combination of three physical disks, for example, in three physical disks having sequence numbers in an arithmetic sequence, when a physical disk is added and after a space capacity for storage is expanded.

Step S301: Acquire the total number M of physical disks, and allocate the sequence number M+1 to the physical disk Y.

Step S302: Acquire all groups of data blocks that are mapped to the physical disk 1# first.

In this step, a group of data blocks refers to a set of data blocks, or a set of first copies, or a set of second copies that are mapped to the physical disk 1#. As shown in FIG. 10, the set of the data blocks that are mapped to the physical disk 1# refers to P1, P8, or P15; the set of the first copies that are mapped to the physical disk 1# refers to P7' or P14'; and likewise, the set of the second copies refers to P6" or P13".

Step S303: Poll two physical disks numbered M and M−1, and locate a sequence number K of a disk in which the group of data blocks appears first.

Step S304: If K is M−1, cut and paste the group of data blocks stored on the physical disk 1# to the new physical disk M+1.

Step S305: If K is M, cut and paste the group of data blocks stored on the physical disk 2# to the new physical disk M+1.

For each group of data blocks in all virtual storage partitions acquired in step S302, step S303 to step S305 are cyclically performed.

The storage method in this embodiment further includes: after a new physical disk is online, a part of data is automatically migrated to the new physical disk, so that a load of each physical disk is relatively balanced. Meanwhile, after data migration is performed according to the foregoing steps, a data block and copies thereof are still placed in a regular combination of three physical disks, for example, in three physical disks having sequence numbers in an arithmetic sequence, thereby ensuring that data reliability does not decrease after a physical disk is added.

In the storage method in this embodiment, the three consecutive virtual storage partitions are mapped only to a regular physical disk combination, which reduces the number of physical disk combinations and improves data storage reliability. In addition, when one of physical disks used for storage is faulty and becomes a failing physical disk, a target disk is automatically searched for to perform data copying and recovery for a data block placed on the failing physical disk; when a physical disk used for storage is added, a part of data is automatically migrated to the new physical disk, so that a load of each physical disk is relatively balanced, and data reliability after data recovery or data migration does not decrease.

Embodiment 2

Figure 12:
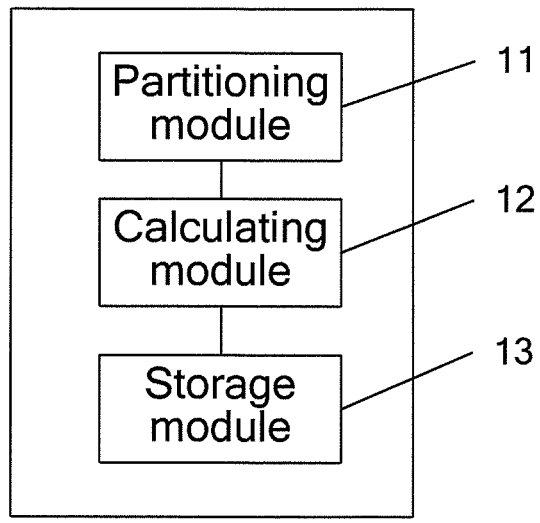
FIG. 12 is a structural block diagram of a storage apparatus according to Embodiment 2 of the present invention.

As shown in FIG. 12, corresponding to the storage method in Embodiment 1, this embodiment further provides a storage apparatus, including:

a partitioning module 11, configured to partition raw data into several data blocks;

a calculating module 12, configured to calculate, according to a preset mapping algorithm, three consecutive virtual storage partitions to which a first data block is mapped, where a virtual storage partition is a partition obtained by dividing a virtual storage area, each of the virtual storage partitions is mapped to one physical disk, physical disks have consecutive sequence numbers, and sequence numbers of three physical disks that are mapped to the three consecutive virtual storage partitions are in an arithmetic sequence with a non-zero common difference; and a storage module 13, configured to store, according to the calculated three consecutive virtual storage partitions and the three physical disks that are mapped to the three consecutive virtual storage partitions, the first data block and a first copy and a second copy of the first data block in the three physical disks in sequence.

In the storage apparatus in this embodiment, three logically consecutive virtual storage partitions are mapped only to a regular physical disk combination, for example, three physical disks having sequence numbers in an arithmetic sequence. Compared with the prior art, the present invention reduces the number of physical disk combinations and significantly improves data storage reliability. In addition, a larger number of physical disks used for storage improve data storage reliability more significantly.

Optionally, the preset mapping algorithm is a hash algorithm.

As a preferred solution, the common difference of the arithmetic sequence is 1.

Figure 13:
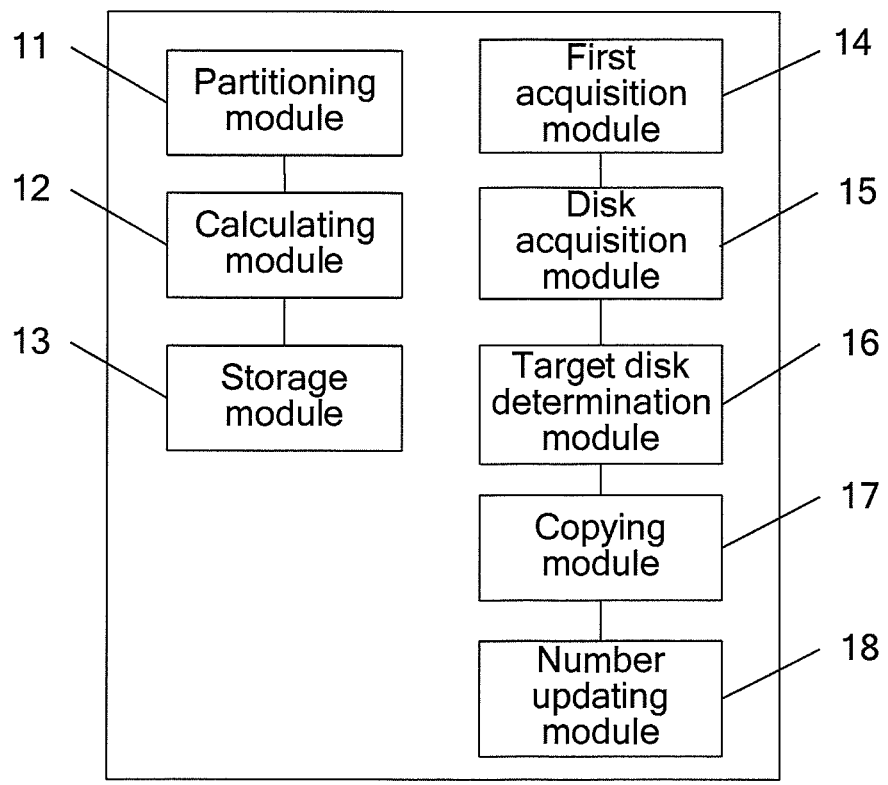
FIG. 13 is a structural block diagram of a storage apparatus according to Embodiment 2 of the present invention.

Further, when one of the physical disks is faulty and becomes a failing physical disk, the storage apparatus in this embodiment, as shown in FIG. 13, further includes:

a first acquisition module 14, configured to acquire, for each virtual storage partition that is mapped to the failing physical disk, three groups of the three consecutive virtual storage partitions that include the virtual storage partition;

a disk acquisition module 15, configured to acquire, for each group of the three consecutive virtual storage partitions, a first physical disk and a second physical disk to which the remaining two virtual storage partitions are mapped, except for the virtual storage partition that is mapped to the failing physical disk;

a target disk determination module 16, configured to determine, according to the first physical disk and the second physical disk, a target physical disk that is used for recovering data;

a copying module 17, configured to copy all target data blocks that are stored in the first physical disk and/or the second physical disk to the target physical disk, where the target data blocks are data blocks that are mapped to the three consecutive virtual storage partitions, or a first copy or a second copy of the data blocks; and a sequence number updating module 18, configured to renumber a part of physical disks, so that physical disks that are not faulty have consecutive sequence numbers.

The storage apparatus in this embodiment may automatically search for a target disk for a data block placed thereon to perform data copying and recovery, when one of physical disks used for storage is faulty and becomes a failing physical disk, so that the recovered data block and copies thereof are still placed in a combination of physical disks having sequence numbers in an arithmetic sequence, thereby ensuring that data reliability after the fault is rectified does not decrease.

Figure 14:
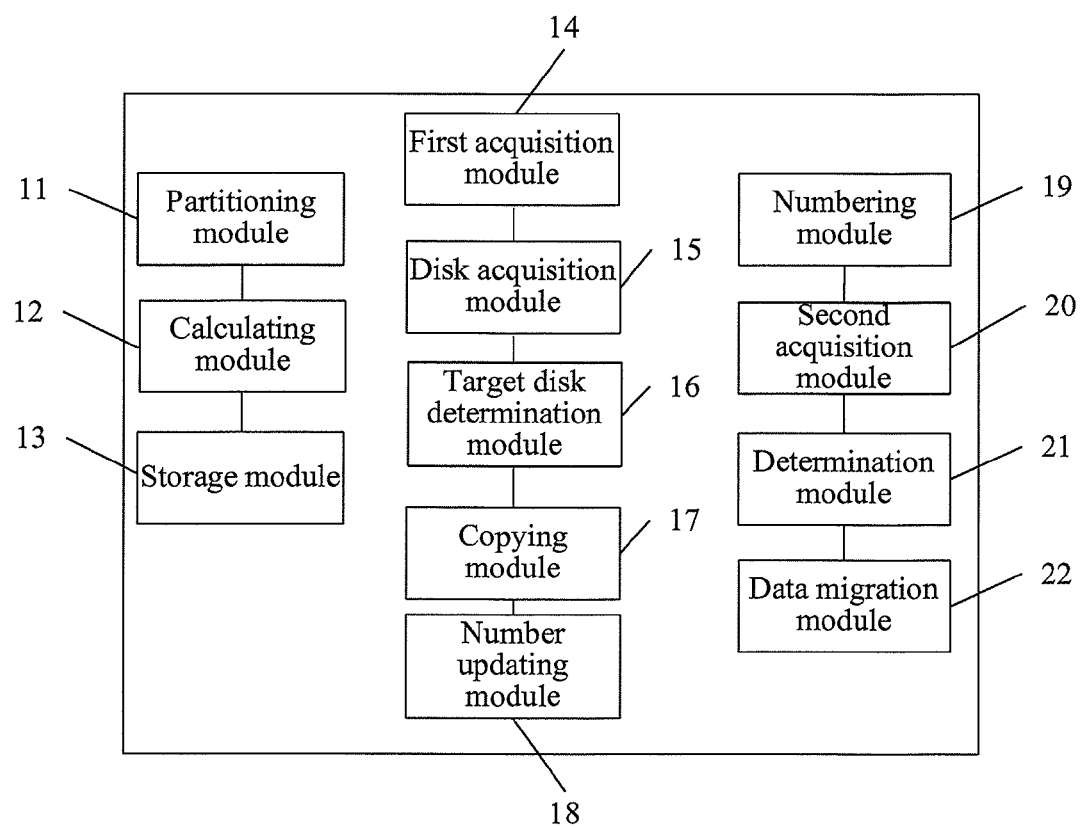
FIG. 14 is a structural block diagram of a storage apparatus according to Embodiment 2 of the present invention.

Further, when a new physical disk is detected, the storage apparatus in this embodiment, as shown in FIG. 14, further includes:

a numbering module 19, configured to number the new physical disk with a maximum sequence number in a consecutive numbering manner;

a second acquisition module 20, configured to acquire, for each virtual storage partition that is mapped to a physical disk having a first sequence number, three groups of the three consecutive virtual storage partitions that include the virtual storage partition;

a determination module 21, configured to individually determine whether a virtual storage partition in each group of the three consecutive virtual storage partitions has a mapping relationship with a physical disk having a sequence number that is 2 less than the sequence number of the new physical disk; and a data migration module 22, configured to: if a mapping relationship exists, cut and paste second copies of all data blocks that are mapped to the group of the three consecutive virtual storage partitions in the physical disk having the first sequence number to the new physical disk.

The second acquisition module 20 is further configured to acquire, for each virtual storage partition that is mapped to a physical disk having a second sequence number, three groups of the three consecutive virtual storage partitions that include the virtual storage partition;

the determination module 21 is further configured to individually determine whether a virtual storage partition in each group of the three consecutive virtual storage partitions has a mapping relationship with a physical disk having a sequence number that is 1 less than the sequence number of the new physical disk; and the data migration module 22 is further configured to: if a mapping relationship exists, cut and paste second copies of all data blocks that are mapped to the group of the three consecutive virtual storage partitions in the physical disk having the second sequence number to the new physical disk.

The storage apparatus in this embodiment automatically migrates a part of data to a new physical disk, after the new physical disk is online, so that a load of each physical disk is relatively balanced. Meanwhile, after data is migrated, a data block and copies thereof are still placed in a regular combination of three physical disks, thereby ensuring that data reliability does not decrease after a physical disk is added.

In the storage method in this embodiment, consecutive virtual storage partitions used for storing a data block and copies thereof are mapped only to a regular physical disk combination, which reduces the number of physical disk combinations and significantly improves data storage reliability. In addition, when one of physical disks used for storage is faulty or a physical disk used for storage is added, data reliability does not decrease.

Based on the foregoing descriptions of the embodiments, it may be clearly understood by a person skilled in the art that, the present invention may be implemented by software in addition to necessary universal hardware, and certainly may also be implemented by hardware. However, in many cases, the former implementation manner is preferred. Based on such an understanding, the technical solutions of the present invention essentially, or the part contributing to the prior art may be implemented in the form of a software product. The computer software product is stored in a readable storage medium, for example, a floppy disk, a hard disk, an optical disc of a computer, or the like, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A storage method, comprising:
   partitioning raw data into a plurality of data blocks;
   calculating, according to a preset mapping algorithm, three consecutive virtual storage partitions to which a first data block is mapped, wherein a virtual storage partition is a partition obtained by dividing a virtual storage area, each of the virtual storage partitions is mapped to one physical disk, physical disks have consecutive sequence numbers, and sequence numbers of three physical disks that are mapped to the three consecutive virtual storage partitions are in an arithmetic sequence with a non-zero common difference; and
   storing, according to the calculated three consecutive virtual storage partitions and the three physical disks that are mapped to the three consecutive virtual storage partitions, the first data block and a first copy and a second copy of the first data block in the three physical disks in sequence;
   wherein when one of the physical disks is faulty and becomes a failing physical disk, the method further comprises:
   acquiring, for each virtual storage partition that is mapped to the failing physical disk, three groups of the three consecutive virtual storage partitions that comprise the virtual storage partition;
   acquiring, for each group of the three consecutive virtual storage partitions, a first physical disk and a second physical disk to which the remaining two virtual storage partitions are mapped, except for the virtual storage partition that is mapped to the failing physical disk;
   determining, according to the first physical disk and the second physical disk, a target physical disk that is used for recovering data;
   copying all target data blocks that are stored in the first physical disk and/or the second physical disk to the target physical disk, wherein the target data blocks are data blocks that are mapped to the three consecutive virtual storage partitions, or a first copy or a second copy of the data blocks; and
   renumbering a part of physical disks, so that physical disks that are not faulty have consecutive sequence numbers.

2. The method according to claim 1, wherein the preset mapping algorithm comprises a hash algorithm.

3. The method according to claim 1, wherein the common difference of the arithmetic sequence is 1.

4. A storage method, comprising:
   partitioning raw data into a plurality of data blocks;
   calculating, according to a preset mapping algorithm, three consecutive virtual storage partitions to which a first data block is mapped, wherein a virtual storage partition is a partition obtained by dividing a virtual storage area, each of the virtual storage partitions is mapped to one physical disk, physical disks have consecutive sequence numbers, and sequence numbers of three physical disks that are mapped to the three consecutive virtual storage partitions are in an arithmetic sequence with a non-zero common difference; and storing, according to the calculated three consecutive virtual storage partitions and the three physical disks that are mapped to the three consecutive virtual storage partitions the first data block and a first copy and a second copy of the first data block in the three physical disks in sequence;

wherein when a new physical disk is detected, the method further comprises:

numbering the new physical disk with a maximum sequence number in a consecutive numbering manner;

acquiring, for each virtual storage partition that is mapped to a physical disk having a first sequence number, three groups of the three consecutive virtual storage partitions that comprise the virtual storage partition;

individually determining whether a virtual storage partition in each group of the three consecutive virtual storage partitions has a mapping relationship with a physical disk having a sequence number that is 2 less than the sequence number of the new physical disk;

if a mapping relationship exists, cutting and pasting second copies of all data blocks that are mapped to the group of the three consecutive virtual storage partitions in the physical disk having the first sequence number to the new physical disk;

acquiring, for each virtual storage partition that is mapped to a physical disk having a second sequence number, three groups of the three consecutive virtual storage partitions that comprise the virtual storage partition;

individually determining whether a virtual storage partition in each group of the three consecutive virtual storage partitions has a mapping relationship with a physical disk having a sequence number that is 1 less than the sequence number of the new physical disk; and if a mapping relationship exists, cutting and pasting second copies of all data blocks that are mapped to the group of the three consecutive virtual storage partitions in the physical disk having the second sequence number to the new physical disk.

5. A storage apparatus, comprising:
at least one processor configured to:
partition raw data into a plurality of data blocks;
calculate, according to a preset mapping algorithm, three consecutive virtual storage partitions to which a first data block is mapped, wherein a virtual storage partition is a partition obtained by dividing a virtual storage area, each of the virtual storage partitions is mapped to one physical disk, physical disks have consecutive sequence numbers, and sequence numbers of three physical disks that are mapped to the three consecutive virtual storage partitions are in an arithmetic sequence with a non-zero common difference; and store, according to the calculated three consecutive virtual storage partitions and the three physical disks that are mapped to the three consecutive virtual storage partitions, the first data block and a first copy and a second copy of the first data block in the three physical disks in sequence;

wherein when one of the physical disks is faulty and becomes a failing physical disk, the at least one processor is further configured to:

acquire, for each virtual storage partition that is mapped to the failing physical disk, three groups of the three consecutive virtual storage partitions that comprise the virtual storage partition;

acquire, for each group of the three consecutive virtual storage partitions, a first physical disk and a second physical disk to which the remaining two virtual storage partitions are mapped, except for the virtual storage partition that is mapped to the failing physical disk;

determine, according to the first physical disk and the second physical disk, a target physical disk that is used for recovering data;

copy all target data blocks that are stored in the first physical disk and/or the second physical disk to the target physical disk, wherein the target data blocks are data blocks that are mapped to the three consecutive virtual storage partitions, or a first copy or a second copy of the data blocks; and renumber a part of physical disks, so that physical disks that are not faulty have consecutive sequence numbers.

6. The apparatus according to claim 5, wherein the preset mapping algorithm comprises a hash algorithm.

7. The apparatus according to claim 5, wherein the common difference of the arithmetic sequence is 1.

8. A storage apparatus, comprising:
at least one processor configured to:
partition raw data into a plurality of data blocks;
calculate, according to a preset mapping algorithm, three consecutive virtual storage partitions to which a first data block is mapped, wherein a virtual storage partition is a partition obtained by dividing a virtual storage area, each of the virtual storage partitions is mapped to one physical disk, physical disks have consecutive sequence numbers, and sequence numbers of three physical disks that are mapped to the three consecutive virtual storage partitions are in an arithmetic sequence with a non-zero common difference; and store, according to the calculated three consecutive virtual storage partitions and the three physical disks that are mapped to the three consecutive virtual storage partitions, the first data block and a first copy and a second copy of the first data block in the three physical disks in sequence;

wherein when a new physical disk is detected, the at least one processor is further configured to:

number the new physical disk with a maximum sequence number in a consecutive numbering manner;

acquire, for each virtual storage partition that is mapped to a physical disk having a first sequence number, three groups of the three consecutive virtual storage partitions that comprise the virtual storage partition;

individually determine whether a virtual storage partition in each group of the three consecutive virtual storage partitions has a mapping relationship with a physical disk having a sequence number that is 2 less than the sequence number of the new physical disk;

if a mapping relationship exists, cut and paste second copies of all data blocks that are mapped to the group of the three consecutive virtual storage partitions in the physical disk having the first sequence number to the new physical disk;

acquire, for each virtual storage partition that is mapped to a physical disk having a second sequence number, three groups of the three consecutive virtual storage partitions that comprise the virtual storage partition;

individually determine whether a virtual storage partition in each group of the three consecutive virtual storage partitions has a mapping relationship with a physical disk having a sequence number that is 1 less than the sequence number of the new physical disk; and if a mapping relationship exists, cut and paste second copies of all data blocks that are mapped to the group of the three consecutive virtual storage partitions in the physical disk having the second sequence number to the new physical disk.

* * * * *